R. MUELLER.
SELF RETAINING COUPLING WASHER.
APPLICATION FILED JUNE 25, 1910.
1,157,574.
Patented Oct. 19, 1915.
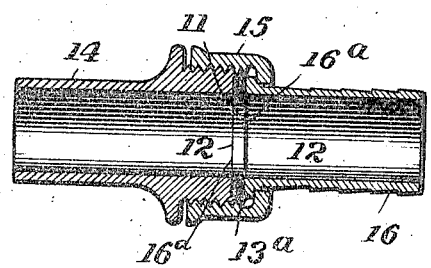
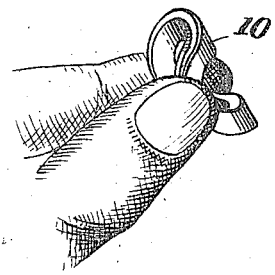
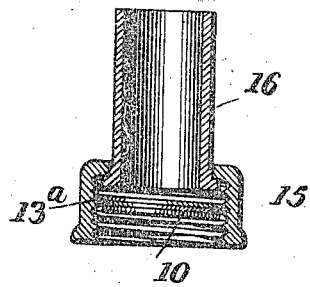
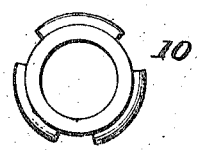
Inventor
Robert Mueller

UNITED STATES PATENT OFFICE.

ROBERT MUELLER, OF DECATUR, ILLINOIS, ASSIGNOR TO H. MUELLER MANUFACTURING COMPANY, OF DECATUR, ILLINOIS, A CORPORATION OF ILLINOIS.

SELF-RETAINING COUPLING-WASHER.

1,157,574.

Specification of Letters Patent.  Patented Oct. 19, 1915.

Application filed June 25, 1910.  Serial No. 568,935.

*To all whom it may concern:*

Be it known that I, ROBERT MUELLER, a citizen of the United States, residing at Decatur, in the county of Macon and State of Illinois, have invented new and useful Improvements in Self-Retaining Coupling-Washers, of which the following is a specification.

My invention relates to improvements in self-retaining coupling washers, and has particular relation to devices of this character adapted to be used in connection with couplings of different types, such for instance as are employed for connecting different sections of hose with each other or with a hydrant or tank to or from which liquids are adapted or designed to flow.

Washers for this purpose are placed between the opposing faces of the male connecting member of the coupling and the opposing connecting member, the latter generally carrying the female portion of the coupling in swiveled relation thereto, the washer being clamped between the end faces of said members by the action of the screw-threads on the male and female members of the coupling. Washers for this purpose have been made of different materials including soft metal and rubber (which may be of a reinforced type), the soft metal washers being in the form of gaskets and being employed where the female member of the coupling has a fixed or integral relation with the member of which it forms a part. While the soft metal gasket form of washer provides an efficient means for the purpose intended, its use is restricted almost entirely to service conditions where the walls of the central opening can be supported by a metallic member of such type as will resist the flow of the metal inwardly, the flow following the path of least resistance. Where the female coupling member is formed of two parts swiveled together the flow of the soft metal, when restricted attempts to seek an outlet around the contacting or opposing edges of the two parts of the coupling and tends to bind them together, making the assembling of the parts more difficult. Furthermore, the metallic gasket structure retains the shape assumed by it under compression, when the parts are separated, rendering it difficult to again bring the parts into position to form an efficient closure when the coupling is again made, since there is no surety that the parts will assume the exact positions provided by the first coupling operation. For these reasons a soft metal gasket structure is not considered as an efficient closure in connection with couplings having the female member of the connection formed in two parts swiveled together. By reason of the material the compression of the gasket permits or causes the outer periphery thereof to engage with and conform to the screw threads of the female member, and in this manner retain the washer in position when this connection is made; but, as heretofore stated, the disadvantages in attempting to employ a soft metal gasket in connection with detachable couplings where the female member is formed of one part swiveled to another, are such as to render such structure impracticable. Where the washer is formed of rubber (or of a composition which includes rubber in order that the resultant structure may possess flexibility and resiliency) the washer itself has a diameter less than that of the inner diameter of the screw threads of the female member with the result that the washer is loosely seated within the member at all times excepting when clamped in position by the male member. Obviously, loss of the washer from the female member can readily take place when the parts are separated, as when the hose is being detached from sill cocks or hydrants, or when being dragged across a lawn or being put away, and to prevent dropping out of the washer during coupling, the female member must necessarily be held in such position as to prevent a dropping out of the washer. and this at times is a difficult matter. Furthermore, there is no surety of the washer being properly positioned within the coupling owing to such loose seating.

The present invention aims to eliminate these objections and provide a structure which includes all of the advantages possessed by both types of structures.

The principal object of my invention is, therefore, to provide a washer possessing the qualities of flexibility, elasticity and resiliency, with means formed integral therewith for engaging the screw threads or other abutment formed on the inner periphery of the female member of the coupling to provide a self-retaining element for the washer.

A further object is to provide a washer having a substantially uniform cross section throughout its main portion, with an outer peripheral configuration of a character which will seat within the screw threads of the female member of the coupling, the whole being formed of a material possessing the qualities of flexibility, elasticity and resiliency.

A further object is to provide a washer, possessed of the qualities of flexibility, elasticity and resiliency, with an integral peripheral rib or flange extending outwardly in a circular plane, said rib being continuous or interrupted in the direction of its length as may be desired, and which has a cross sectional configuration adapted to fit within a thread of the female member of the coupling, said rib possessing the same qualities as the main portion of the washer, the rib of the washer forming a self-retaining element.

Other objects are to provide a structure which is durable in construction, which can be readily inserted within the coupling, which will retain its position within the coupling, which, if necessary, may be moved lengthwise of the coupling during the coupling up of the coupling members, which is efficient in operation, and which can be changed from one coupling to another without affecting its usefulness.

To these and other ends, the nature of which will be readily understood as the invention is hereinafter disclosed, said invention consist in the improved construction and combination of parts hereinafter fully described, illustrated in the accompanying drawings, and particularly pointed out in the appended claims.

In the accompanying drawings, in which similar reference characters indicate similar parts in each of the views:—Figure 1 is a central, longitudinal sectional view of a hose coupling in coupled position, showing my improved washer in position therein. Fig. 2 is a sectional view of the female member of a coupling and showing the washer in position prior to a coupling of the members, illustrating the impossibility of the washer dropping out of the coupling. Fig. 3 is a cross sectional view of the washer. Fig. 4 is a perspective view illustrating the manner in which the washer is doubled up for the purpose of inserting it within the female member of a coupling. Fig. 5 is an elevation showing a modified form of peripheral rib structure.

My improved washer, designated as 10, is formed of a material which possesses the quality of flexibility, elasticity and resiliency, such for instance as rubber, being preferably of the general type of washers, having a central opening 11, and having the diameter of the outer periphery of its main portion approximately equal to the inner diameter of the threads of the female member of a coupling, this main portion of the washer, indicated as 12, having its side faces parallel with each other to provide a cross section somewhat similar to a rectangle.

Formed integral with the washer and located on the outer periphery thereof is an annular rib 13 preferably extending circularly therearound, said rib having a width less than the width of the main portion of the washer and having a projection length to approximately correspond with the depth of the screw threads of the female member of the coupling. As this rib is formed integral with the main portion of the washer, it also possesses the qualities of flexibility, elasticity and resiliency, but being of a less cross sectional area than that of the main portion of the washer, the flexibility thereof is sufficiently increased to permit of a ready insertion of the washer within the coupling member. The rib is preferably positioned at one side of the width of the washer, as shown in the drawings, and may be either in the form of a continuous rib or one which is interrupted in the direction of its length, as for instance a structure such as indicated in Fig. 5, one or more interruptions in the continuity of the rib being provided. Preferably the interruptions in the continuity of the rib will be such as will produce a series of symmetrically arranged engaging lugs so that the washer will be "balanced," that is by reason of this symmetrical arrangement will, when inserted in the coupling, take a concentric position, and not be placed eccentric to the bore of the coupling, as would be the case if the symmetrical arrangement shown in Fig. 5 was not observed. Or, if desired, more than one peripheral rib may be employed, each rib lying in a plane substantially parallel with a face of the washer or coincident therewith so that one face of the rib is substantially flush with a face of the body portion of the washer.

In employing the washer herein disclosed, it may be inserted within the female member of the coupling in any preferred manner, Fig. 4, illustrating one way in which this result can be produced, the washer being doubled up in such manner as will permit of its ready insertion within the coupling member, it being obvious that while the change in shape produced by the fingers as indicated in Fig. 4 may cause a binding on the elongated diametrical length of the doubled washer, the elasticity and resiliency of the member and its rib will permit sufficient yielding rearwardly to enable the washer to be inserted within the coupling member, the rib moving over the threads under the pressure placed thereon by the fingers; it will also be understood that if necessary, the washer may be forced rearwardly to a greater extent by pressure applied by any suitable instrument, or the threading of the male member within the female member will cause the washer to be moved along over the screw-threads until it contacts with the opposite face engaged by it when in clamped position.

In Fig. 2, I have shown the washer in a position ready for the insertion of the male member of the coupling, clearly showing that the washer cannot drop out of the female member. In Fig. 1 I have shown the members as coupled together, the male member being indicated as 14, the swiveled part of the female member as 15, and the part of the female member on which the swiveled part 15 is located is indicated as 16, the opposing clamping faces of the two coupling members being indicated at 16ª.

The advantages of this construction have been heretofore pointed out and are believed to be obvious, the structure providing all of the advantages possessed by both the soft metal gasket and the ordinary washer structures, and at the same time eliminating all of the disadvantages possessed by both types.

While I have herein shown and described one way in which my invention may be carried out, changes therein may be made, and I desire it to be understood that I reserve the right to make any and all such modifications therein as may be made necessary by the conditions arising in use, in so far as such modifications may fall within the spirit and scope of my invention as expressed in the accompanying claims.

Having thus described my invention what I claim as new is:

1. A self-retaining washer for hose couplings formed of flexible material and provided with a central opening; said washer having on its external periphery an integral relatively thin rib one face of which is substantially flush with a face of the washer and of such resiliency that it will yield readily to permit the insertion of the washer into a threaded coupling and engage the threads thereof to lock the washer in place after it has been positioned.

2. A self-retaining washer for hose couplings formed of flexible material and provided with a central opening; said washer having on its external periphery an integral relatively thin rib one face of which is substantially flush with a face of the washer and of such resiliency that it will yield readily to permit the insertion of the washer into a threaded coupling and engage the threads thereof to lock the washer in place after it has been positioned, said thread engaging rib being interrupted in the direction of its length to form a series of symmetrically-arranged projections.

3. A self-retaining washer for hose-couplings formed of flexible material and provided with a central opening; said washer having on its external periphery a plurality of symmetrically-arranged projections of less thickness than the body of the washer so as to yield readily to permit the washer to be inserted in a hose coupling and to engage the threads thereof to lock the washer in place therein.

In testimony whereof I have hereunto set my hand in presence of two subscribing witnesses.

ROBERT MUELLER.

Witnesses:
W. R. BIDDLE,
O. H. HATFIELD.